US006165602A

United States Patent [19]
Fujita

[11] Patent Number: 6,165,602
[45] Date of Patent: Dec. 26, 2000

[54] LAMINATED POLYESTER FILM

[75] Inventor: Masato Fujita, Shiga-ken, Japan

[73] Assignee: Mitsubishi Polyester Film Corporation, Tokyo, Japan

[21] Appl. No.: 09/095,709

[22] Filed: Jun. 11, 1998

[30] Foreign Application Priority Data

| Jun. 12, 1997 | [JP] | Japan | 9-154915 |
| Aug. 6, 1997 | [JP] | Japan | 9-211753 |
| Sep. 12, 1997 | [JP] | Japan | 9-248303 |

[51] Int. Cl.⁷ .......... B32B 27/08; B32B 27/18; B32B 27/30; B32B 27/36; B32B 27/40
[52] U.S. Cl. .......... 428/216; 428/213; 428/214; 428/323; 428/355 EP; 428/355 EN; 428/355 N; 428/423.1; 428/423.7; 428/480; 428/694 TS; 428/694 BS; 525/56; 525/58; 525/123; 525/165; 525/167; 525/173; 525/174; 525/176; 524/366; 524/378; 430/531; 430/533; 430/534
[58] Field of Search .......... 428/213, 323, 428/343, 355 EP, 355 EN, 355 N, 413, 423.1, 423.7, 480, 694 TS, 694 BS, 214.216, 910; 525/56, 58, 123, 165, 176, 167, 173, 174; 524/366, 378; 430/531, 533, 534

[56] References Cited

U.S. PATENT DOCUMENTS

| 4,340,519 | 7/1982 | Kotera et al. | 523/414 |
| 4,824,725 | 4/1989 | Thoese | 428/336 |
| 5,139,867 | 8/1992 | Light | 428/327 |
| 5,281,472 | 1/1994 | Takahashi et al. | 428/336 |
| 5,306,606 | 4/1994 | Tachibana et al. | 430/533 |
| 5,334,457 | 8/1994 | Wada et al. | 428/480 |
| 5,378,592 | 1/1995 | Nakanishi et al. | 430/533 |
| 5,540,974 | 7/1996 | Hoseki et al. | 428/141 |

FOREIGN PATENT DOCUMENTS

| 201 715 | 11/1986 | European Pat. Off. |
| 849 627 | 6/1998 | European Pat. Off. |
| 49-10243 | 3/1974 | Japan |
| 52-19786 | 2/1977 | Japan |
| 52-19787 | 2/1977 | Japan |
| 54-43017 | 4/1979 | Japan |

*Primary Examiner*—Vivian Chen
*Attorney, Agent, or Firm*—Foley & Lardner

[57] ABSTRACT

A laminated polyester film stretched in at least one direction, comprising:
- a polyester support, and
- at least one enhanced adhesion layer laminated on the polyester support, comprising a composition comprising:
  (1) an aromatic copolyester (A1) having a water-dispersible functional group, a polyvinyl alcohol resin (B1), and a vinylpyrrolidone copolymer resin (C1); or
  (2) an aromatic copolyester (A1) having a water-dispersible functional group, a polyvinyl alcohol resin (B1), and a polyglycerol polyglycidyl ether (C2); or
  (3) an aqueous-type polyurethane (A3), a polyvinyl alcohol resin (B3), and inert particles wherein the thickness (L) of the adhesion layer and the average particle diameter (d) of said inert particles satisfies the equation $$1/3 \leq d/L \leq 3.$$

5 Claims, No Drawings

LAMINATED POLYESTER FILM

BACKGROUND OF THE INVENTION

The present invention relates to a laminated polyester film and, more specifically, it relates to a biaxially stretched laminated polyester film having an enhanced adhesion layer formed on at least one surface of a polyester support film, which has excellent adhesive properties. The laminated polyester film according to the present invention has especially excellent adhesive properties to a functional layer containing as a major component a water-soluble or hydrophilic resin such as polyvinyl alcohol or gelatin.

Since polyester films, typically polyethylene terephthalate (PET) and polyethylene naphthalate (PEN) films, are excellent in mechanical strengths, dimensional stability, flatness, heat resistance, chemical resistance, optical characteristics and cost performance, they are used as a support film for various applications. For example, a polyester film is widely utilized as a support for a magnetic tape having a functional layer such as a magnetic layer laminated on at least one of the both surfaces of the support. In recent years, there is an increasing demand for use of an aqueous-type diluent as a diluting solvent for the preparation of a coating composition for the functional layer, because of safety in manufacturing works. To meet with this demand, a water-soluble or hydrophilic resin such as polyvinyl alcohol or gelatin is increasingly used as a binder for various functional layers.

Biaxially stretched polyester films whose surfaces are highly crystalline and which have strong cohesion, have a drawback that the adhesion thereof to a functional layer is weak. To solve this problem, there have been proposed a number of methods such as a method in which a low crystalline polyester layer is laminated on such a polyester film by co-extrusion and a method in which a primer layer such as a water-dispersible polyester resin or an acrylic resin is applied onto such a polyester film (described in Japanese Patent Publication (KOKOKU) No. 49-10243(1974) and Japanese Patent Applications Laid-open (KOKAI) Nos. 52-19786(1977), 52-19787(1977) and 54-43017(1979)).

A polyester film having a primer layer composed of a polyester resin or an acrylic resin, however, has a defect that adhesion properties to a functional layer containing a water-soluble or hydrophilic resin such as polyvinyl alcohol as a major component are unsatisfactory.

As a result of the present inventors' earnest studies to solve the above problem, it has been found that a laminated film stretched in at least one direction, comprising a polyester film support and an adhesive layer having a specific composition, is excellent in adhesive properties to a functional layer containing as a major component a water-soluble or hydrophilic resin. The present invention has been attained on the basis of the above finding.

SUMMARY OF THE INVENTION

The object of the present invention to provide a laminated polyester film which is excellent in adhesive properties to functional layers (i) containing a water-soluble or hydrophilic resin such as polyvinyl alcohol as a major component, which is typically used as printing ink image receiving layers used in ink jet recording, or (ii) containing a water-soluble or hydrophilic resin such as gelatin as a major component, which is typically used as photographic sensitive layers.

To attain the above object, in a first aspect of the present invention, there is provided a laminated polyester film stretched in at least one direction, comprising:

a polyester support, and at least one enhanced adhesion layer laminated on the polyester support, comprising:

at least one of an aqueous-type polyester or an aqueous-type polyurethane; and at least one of an aqueous-type resin having vinyl alcohol as a main constituting unit thereof or a polyglycerol polyglycidyl ether.

In a second aspect of the present invention, there is provided a laminated polyester film stretched in at least one direction, comprising:

a polyester support, and at least one enhanced adhesion layer laminated on the polyester support comprising:

composition (1) an aromatic copolyester (A1) having a water-dispersible functional group and polyvinyl alcohol (B1);

composition (2) an aromatic copolyester (A2) having a water-dispersible functional group and a polyglycerol polyglycidyl ether (B2); or composition (3) an aqueous-type polyurethane (A3) and a water-soluble resin (B3).

In a third aspect of the present invention, there is provided a laminated polyester film stretched in at least one direction, comprising:

a polyester support, and at least one enhanced adhesion layer laminated on the polyester support, comprising a composition comprising an aromatic copolyester (A1) having a water-dispersible functional group and polyvinyl alcohol (B1).

In a fourth aspect of the present invention, there is provided a laminated polyester film stretched in at least one direction, comprising:

a polyester support, and at least one enhanced adhesion layer laminated on the polyester support, comprising a composition comprising an aromatic copolyester (A2) having a water-dispersible functional group and a polyglycerol polyglycidyl ether (B2).

In a fifth aspect of the present invention, there is provided a laminated polyester film stretched in at least one direction, comprising:

a polyester support, and at least one enhanced adhesion layer laminated on the polyester support, comprising a composition comprising an aqueous-type polyurethane (A3) and a water-soluble resin (B3).

DETAILED DESCRIPTION OF THE INVENTION

The present invention is described in more detail.

As a polyester resin constituting a stretched polyester film support used in the present invention, there may be used polyethylene terephthalate (PET) comprising ethylene terephthalate units of at least 80 mol % based on the mole of the constituting units thereof, polyethylene-2,6-naphthalate (PEN) containing ethylene-2,6-naphthalate units of at least 80 mol % based on the mole of the constituting units thereof, and poly-1,4-cyclohexanedimethylene terephthalate (PCT) containing 1,4-cyclohexanedimethylene terephthalate units of at least 80 mol % based on the mole of the constituting units thereof, polyethylene isophthalate, poly-1,4-butylene terephthalate (PBT), and the like.

As copolymer components other than the above major constituting units of the polyesters, there may be used, for example, diol units such as propylene glycol, 1,3-butylene glycol, 2,3-butylene glycol, neopentyl glycol, trimethyleneglycol, tetramethylene glycol, hexamethylene glycol, diethylene glycol, triethylene glycol, polyethylene glycol, polytetramethylene glycol and polyalkylene glycols, and dicarboxilic acid units such as isophthalic acid, 2,7-naphthalenedicarboxylic acid, 5-sodiumsulfoisophthalic acid, oxalic acid, malonic acid, succinic acid, adipic acid, azelaic aid, cebacic acid, diphenyl ether dicarboxylic acid and oxymonocarboxylic acid. In addition to homopolymers and copolymers, a blend thereof with a minor amount of other polymers may also be used as the polyester.

The polyester film support may contain a surface roughness imparting agent such as additive particles, precipitated particles and catalyst residues, to impart slip property thereto. The kind, particle size and amount of the roughness imparting agent may be selected depending upon the intended slip characteristics and transparency.

The polyester film support may also contain, if desired, one or more additives such as an anti-static agent, a stabilizer, a lubricant, a crosslinking agent, an anti-blocking agent, anti-oxidant, a UV absorbing agent, a light shielding agent and a colorant. Further, for the purpose of improving whiteness of the polyester film support, a white pigment such as titanium oxide, barium sulfate or magnesium oxide. Furthermore, a void-forming agent such as a resin incompatible with the polyester, e.g. polypropylene, polystyrene or poly-4-methylpentene, may be incorporated into the polyester film support for the purpose of reducing the density thereof.

The polyester film support may have a multi-layered structure. In this case, a part of the layers may be made of a resin other than a polyester.

In the laminated polyester film according to the present invention, at least one of the both surfaces of the above-described polyester film support have an enhanced adhesion layer which is obtained by applying a coating liquid having a specific composition onto the surface, followed by drying and which is stretched in at least one direction.

The enhanced adhesion layer comprises a composition selected from the following compositions (1) to (3):

Composition (1) comprising (A) an aromatic copolyester having a water-dispersible functional group, and (B) polyvinyl alcohol;

Composition (2) comprising (A) an aromatic copolyester having a water-dispersible functional group, and (B) a polyglycerol polyglycidyl ether; and Composition (3) comprising (A) an aqueous-type polyurethane, and (B) a water-soluble resin.

The above Compositions (1) to (3) will be next described in order.

In the fourth aspect according to the present invention, the enhanced adhesion layer comprises Composition (1). Thus, the enhanced adhesion layer comprises an aromatic copolyester having a water-dispersible functional group and a polyvinyl alcohol and serves to improve adhesion between the biaxially stretched polyester film support and a hydrophilic functional layer. Hereinafter, the aromatic copolyester having a water-dispersible functional group contained in Composition (1) is defined as Adhesion Polyester (1).

Adhesion Polyester (1) may be prepared by ordinary polycondensation using as raw materials a hydroxyl compound and a carboxylic acid compound as described below.

As the hydroxyl compound, an aliphatic hydroxyl compound, an alicyclic hydroxyl compound and an aromatic hydroxyl compound are exemplified. Of these, an aliphatic hydroxyl compound and an alicyclic hydroxyl compound is preferred.

When the condensed diol of ethylene glycol such as diethylene glycol, is used as the hydroxyl compound, the content thereof is preferably not more than 20 mol %, more preferably not more than 10 mol % or less, still more preferably not more than 5 mol % based on the total hydroxyl compound components contained in Adhesion Polyester (1). When the content of the condensed diol component is more than 20 mol %, the anti-blocking properties and adhesion properties of the enhanced adhesion layer may be insufficient.

In the case where the aromatic hydroxyl compound is used as the hydroxyl compound, the content thereof is preferably not more than 5 mol %, more preferably not more than 2 mol % based on the total hydroxyl compound components contained in Adhesive Polyester (1). When the content of the aromatic hydroxyl compound component is more than 5 mol %, the adhesion of the enhanced adhesion layer may be insufficient and, further, suitable stretchability in stretching the enhanced adhesion layer together with the polyester film support may not be attained.

As the carboxylic acid compound copolymerized with the above hydroxyl compound, an aromatic carboxylic compound, alicyclic carboxylic acid compound and an aliphatic carboxylic acid compound are exemplified.

When the aromatic carboxylic acid compound is used as the carboxylic acid compound, the content thereof is preferably not more than 100 mol %, more preferably not more than 95 mol %, still more preferably not more than 90 mol % based on the total carboxylic acid compound components contained in Adhesion Polyester (1). The smaller the content of the aromatic carboxylic acid compound component is, the better the adhesiveness of the enhanced adhesion layer is achieved. However, the lower limit of the aromatic carboxylic acid compound is usually 50 mol % based on the total carboxylic acid components contained in Adhesion Polyester (1). When a content of the aromatic carboxylic acid is less than 50 mol %, sufficient anti-blocking properties of the enhanced adhesion layer may not be achieved.

When an aliphatic carboxylic acid compound is used as the carboxylic acid compound, the content thereof is generally not more than 20 mol %, preferably not more than 5 mol %, more preferably not more than 2 mol %, still more preferably 0 mol % based on the total carboxylic acid compound components contained in Adhesion Polyester (1). When the content of the aliphatic carboxylic acid component increases, the adhesiveness of the enhanced adhesion layer is improved, but the anti-blocking properties of the enhanced adhesion layer may be insufficient.

The content of the carboxylic acid components in Adhesion Polyester (1) is preferably such that the aromatic acid is contained in an amount of not less than 50 mol %, more preferably not less than 60 mol % and the alicyclic carboxylic acid components are contained in amounts of 20 to 50 mol %, preferably 10 to 40 mol %.

An ester-forming compound having a water-dispersible functional group and constituting Adhesion Polyester (1) may be, for example, those which have an organic acid group and/or a salt thereof such as hydroxyl group, sulfonic acid group, carboxylic acid group and phosphoric acid group. Examples of preferable ester-forming compounds are aromatic carboxylic acid compounds having a sulfonic acid salt group, aromatic carboxylic acid compounds having a carboxylic acid salt group, hydroxyl compounds having a sulfonic acid salt group and hydroxyl compounds having a carboxylic acid salt group. Of these, the use of aromatic carboxylic acid compounds having a sulfonic acid salt group and hydroxyl compounds having a carboxylic acid salt group are preferred.

The amount of the ester-forming compound having a water-dispersible functional group is preferably 1 to 15 mol %, more preferably 1 to 12 mol %, still more preferably 3 to 12 mol % based on the total hydroxyl compounds or the total carboxylic acid compounds constituting Adhesion Polyester (1). When the amount of the ester-forming compound component exceeds 15 mol %, the adhesiveness and anti-blocking properties of the enhanced adhesion layer may be sometimes insufficient. When the amount of the ester-forming compound component is less than 1 mol %, the adhesion or coating property at the time of forming a hydrophilic resin layer such as a polyvinyl alcohol layer as a functional layer over a surface of the enhanced adhesion layer, may be reduced.

The average molecular weight (as measured by GPC) of Adhesion Polyester (1) which may be constituted of the above components or constituting units is not specifically limited. Generally, the average molecular weight is not less than 5,000, preferably 8,000 to 100,000. When the average molecular weight is less than 1,000, the water resistance of the enhanced adhesion layer or the adhesion to a functional layer may be sometimes reduced.

It is preferred that the glass transition temperature (Tg) of Adhesion Polyester (1) is not less than 20° C., more preferably not less than 30° C., still more preferably not less than 40° C. When the glass transition temperature is less than 20° C., an enhanced adhesion layer having sufficient anti-blocking properties may not be obtained. The glass transition temperature (Tg) of Adhesion Polyester (1) is preferably not more than 140° C. When the glass transition temperature is more than 140° C., sufficient stretchability at the time of stretching the enhanced adhesion layer together with the polyester film support may not be obtained.

Any polyvinyl alcohol may be used as long as it is easily obtainable by the ordinary polymerization technique and is soluble in water.

The degree of polymerization of the polyvinyl alcohol is not specifically limited, but is generally not less than 100, preferably 300 to 40,000. When the degree of polymerization is less than 100, the water resistance of the enhanced adhesion layer may decrease.

The saponification degree of the polyvinyl alcohol is not specifically limited. Generally, a saponified polyvinyl acetate having a saponification degree of not less than 70 mol %, preferably 80 to 99.9 mol % is preferable for practical use.

The blending ratio of the component (A1): the component (B1) is preferably 1:9 to 9:1, more preferably 1:9 to 8:2.

In the third aspect of the present invention, it is preferred that the enhanced adhesion layer contain a copolymer resin (C1) having vinylpyrrolidone as a main constituting unit thereof in addition to the above-described aromatic copolyester (A1) having a water-dispersible functional group and polyvinyl alcohol (B1).

The copolymer resin (C1) having vinylpyrrolidone as a main constituting unit thereof (hereinafter referred to as vinylpyrrolidone polymer) may be prepared by the ordinary polymerization technique.

The vinylpyrrolidone polymer may be a homopolymer or a copolymer of a major amount (not less than 50% by weight) of vinylpyrrolidone unit and a minor amount of a comonomer having an addition polymerizable unsaturated group such as a vinyl group, an allyl group or an acrylic group.

Examples of the comonomers having such an addition polymerizable unsaturated group include those having, as a side chain, an alkyl group, an alkyl ester group, an alkyl ether group, an alkylol group, an amide group, a hydroxyl group, an amino group (secondary, tertiary or quaternary), a polyalkyl ether group, a carboxylic acid group, a carboxylic acid salt group, a sulfonic acid group, a sulfonic acid salt group, a sulfonic acid ester group, a phosphoric acid group, a phosphoric acid salt group and phosphoric acid ester group.

The vinylpyrrolidone polymer may be as polymerized by itself but may be preferably as polymerized in an aqueous medium containing the above-described Adhesion Polyester (1), polyvinyl alcohol or a mixture of Adhesion Polyester (1) and polyvinyl alcohol, which is used for the preparation of the enhanced adhesion layer.

The vinylpyrrolidone polymer generally has a weight average molecular weight of not less than 40,000, preferably 50,000 to 3,000,000. When the weight average molecular weight of the vinylpyrrolidone polymer is less than 40,000, the water resistance of the enhanced adhesion layer may be reduced.

The mixing amount by weight of Adhesion Polyester (1) (aromatic copolyester (A1)), polyvinyl alcohol (B1) and the vinylpyrrolidone polymer (C1) of the enhanced adhesion layer preferably satisfy the following formulas:

$$1/9 \leq (A1)/\{(B1)+(C1)\} \leq 9/1 \qquad \text{(i)}$$

$$2/8 \leq (B1)/(C1) \qquad \text{(ii)}$$

When the an amount of Adhesion Polyester (1) is small, sufficient adhesion between the enhanced adhesion layer and the polyester film support may not be obtained. In order to obtain fully satisfactory adhesion between the enhanced adhesion layer and the polyester film support, it is preferred that the amount of the Adhesion Polyester component (1) present in the enhanced adhesion layer is not less than 40 parts by weight based on 100 parts by weight of the enhanced adhesion layer.

When the amount of the polyvinyl alcohol component (B1) and the vinylpyrrolidone (C1) component is excessively small, the adhesion between the enhanced adhesion layer and a functional layer of a hydrophilic resin may be sometimes insufficient. Thus, the amount of the polyvinyl alcohol component (B1) and the vinylpyrrolidone component (C1) is preferably not less than 10 parts by weight based on 100 parts by weight of the enhanced adhesion layer, respectively, because of sufficient adhesiveness of the enhanced adhesion layer.

If desired, Adhesion Polyester (1) may be used in conjunction with a water-soluble or water-dispersible binder resin for the formation of the enhanced adhesion layer. Examples of preferable binder resins are polyurethane, an acrylic resin, a vinyl resin other than the above-described vinylpyrrolidone polymer, an epoxy resin and an amide resin. The binder resins may be in the form of a copolymer having their skeletal structures composited with each other by copolymerization. Such a composite binder resin may be, for example, an acrylic resin-grafted polyester, acrylic resin-grafted polyurethane, vinyl resin-grafted polyester and vinyl resin grafted polyurethane.

The binder resin other than Adhesion Polyester (1) is preferably not more than 50 parts by weight, more preferably not more than 30 parts by weight based on 100 parts by weight of the enhanced adhesion layer.

The enhanced adhesion layer may contain a crosslinkable compound, if desired as the crosslinkable compound, there may be used methylolated or alkylolated urea, melamine-based, guanamine-based, acrylamide-based or polyamide-based compounds; polyamines; epoxy compounds; oxazoline compounds; aziridine compounds; block isocyanate compounds; silane coupling agents; titanium coupling agents; zirco-aluminate coupling agents; metal chelates; organic acid anhydrides; organic peroxides; and polyfunctional low molecular weight or high molecular weight compounds such as heat- or light-crosslinkable vinyl compounds and light-sensitive resins.

The crosslinkable compound can form crosslinkages with the functional groups of Adhesion Polyester (1) contained in the enhanced adhesion layer, so that the enhanced adhesion layer is imparted with improved cohesion, surface hardness, abrasion resistance, solvent resistance and water resistance. In case where, for example, the functional group of the enhanced adhesion layer is a hydroxyl group, the crosslinkable compound is preferably a melamine compound, a block isocyanate compound or an organic acid anhydride. In case where the functional group of the enhanced adhesion layer is an organic acid or an anhydride thereof, the crosslinkable compound is preferably an epoxy-based compound, a melamine-based compound, an oxazoline-based compound or a metal chelate. In case where the functional group of the enhanced adhesion layer is an amine, the crosslinkable compound is preferably an epoxy-based compound. Thus, the crosslinkable compound is preferably selected according to the functional group contained in the enhanced adhesion layer so as to obtain a high crosslinking efficiency.

So far as the crosslinkable compound has two or more reactive functional groups in one molecule thereof, the compound may be a low molecular weight compound or a high molecular weight polymer.

The amount of the crosslinkable compound is preferably not more than 50 parts by weight, more preferably not more than 30 parts by weight, still more preferably not more than 15 parts by weight based on 100 parts by weight of the enhanced adhesion layer.

The enhanced adhesion layer may contain inert particles (D) to improve the slip characteristics thereof, if desired.

The inert particles may be inorganic or organic inert particles. Examples of the inorganic inert particles include silica sol, alumina sol, calcium carbonate and titanium oxide. Examples of the organic inert particles include those of a polystyrene resin, a polyacrylic resin, a polyvinyl resin, a copolymer thereof and a crosslinked resin thereof. The inert particles preferably have a softening point or a decomposition point of not less than about 200° C., more preferably not less than 250° C., still more preferably not less than 300° C.

It is also preferred that ratio (d/L) of the average particle diameter (d) of the inert particles to the thickness (L) of the enhanced adhesion layer is not less than 1/3, more preferably 1/3 to 3, most preferably 1/2 to 2. When the ratio d/L of less than 1/3, satisfactory slip characteristics may not be attained. When the d/L ratio exceeds 3, the detachment of the particles from the enhanced adhesion layer tend to occur.

In the fourth aspect according to the present invention, the enhanced adhesion layer comprises the Composition (2). Thus, the enhanced adhesion layer contains an aromatic copolyester (A2) having a water-dispersible functional group, a polyglycerol polyglycidyl ether (B2) and a product formed by a thermal reaction thereof and serves to improve adhesion between the stretched polyester film support and a hydrophilic functional layer. Hereinafter, the aromatic copolyester with a water-dispersible functional group contained in Composition (2) is be referred to as Adhesion Polyester (2).

Adhesion Polyester (2) is the same as Adhesion Polyester (1) as defined in the third aspect.

The average molecular weight of the polyglycerol polyglycidyl ether (B2) which is a compound obtained by reaction of glycerin with epichlorohydrine, is not specifically limited but is generally not more than 1,200, preferably 250 to 1,000. When the average molecular weight is more than 1200, the solubility in water may decrease so that it tends to be difficult to use the glycidyl compound in the form of an aqueous coating liquid. The glycidyl compound has at least two, preferably at least three clycidyl groups in one molecule thereof and at least one, preferably at least two hydroxyl groups in one molecule thereof. These functional groups may form one or more linkages resulting from inter-molecular or intra-molecular condensation between the glycidyl group and the hydroxyl group in the enhanced adhesion layer.

In the present invention, Adhesion Polyester (2) and the polyglycerol polyglycidyl ether (B2) are reacted with each other by a heat during the formation of the enhanced adhesion layer, so that the resulting product is present in the enhanced adhesion layer. The reaction includes inter- and intra-molecular condensation. The products by the inter-molecular condensation are, for example, those obtained from the reaction between any of the glycidyl groups of the polyglycerol polyglycidyl ether (B2) and any of the functional groups of Adhesion Polyester (2), such as a terminal hydroxyl group, a terminal carboxylic acid group and hydroxyl, carboxylic acid and carboxylic acid salt groups introduced into Adhesion Polyester (2) as water-dispersible functional groups. The products by the intra-molecular condensation are, for example, those obtained from the reaction between the glycidyl group and the hydroxyl group of the polyglycerol polyglycidyl ether (B). The enhanced adhesion layer may contain a mixture of the products of the above various reactions.

The blending ratio of the component (A2): the component (B2) is preferably 1:9 to 9:1, more preferably 1:9 to 8:2.

In the fourth aspect of the present invention, it is preferred that the enhanced adhesion layer contain a water-soluble resin (C2) such as polyvinyl alcohol, a vinylpyrrolidone polymer, gelatin or a mixture thereof.

Polyvinyl alcohol for use in the fourth aspect is the same as the polyvinyl alcohol (B1) as defined in the third aspect.

The vinylpyrrolidone polymer used as the water-soluble resin and the amount thereof may be the same as those as defined in the third aspect.

The gelatin used as the water-soluble resin may be obtained by decomposing collagen by the conventional technique, followed by purification. An enzyme-treated, low molecular weight gelatin which is unable to form a gel may be used for the purpose of the present invention.

The enhanced adhesion layer may contain inert particles (D) to improve the slip characteristics thereof, if desired. The inert particles and the amount thereof may be the same as those as defined in the third aspect.

The mixing amount by weight of Adhesion Polyester (2) (aromatic copolyester (A2)), polyglycerol polyglycidyl ether (B2) and the water soluble resin (C2) of the enhanced adhesion resin layer preferably satisfy the following formulas $$1/9 \leq (A2)/\{(B2)+(C2))\} \leq 9/1 \qquad \text{(iii)}$$

$$2/8 \leq (B2)/(C2) \leq \qquad \text{(iv)}$$

When the amount of Adhesion Polyester (2) is small, sufficient adhesion between the enhanced adhesion layer and the polyester film support may not be obtained. In order to obtain fully satisfactory adhesion between the enhanced adhesion layer and the polyester film support, it is preferred that the Adhesion Polyester component (2) is contained in an amount of not less than 20 parts by weight based on 100 parts by weight of the enhanced adhesion layer.

When the amount of the polyglycerol polyglycidyl ether (B2) and the water-soluble resin (C2) is small, satisfactory adhesion between the enhanced adhesion layer and a functional layer of a hydrophilic resin may not be attained. Thus, the amounts of the polyglycerol polyglycidyl ether (B2) and the water-soluble resin (C2) is preferably at least 10 parts by weight based on 100 parts by weight of the enhanced adhesion layer because of sufficient adhesiveness of the enhanced adhesion layer.

If desired, Adhesion Polyester (2) may be used in conjunction with a water-soluble or water-dispersible binder resin for the formation of the enhanced adhesion layer. The binder resin and the amount thereof may be the same as those defined in the third aspect.

The enhanced adhesion layer may additionally contain a crosslinkable compound. The crosslinking compound and the amount thereof may be the same as those defined in the third aspect.

In the fifth aspect according to the present invention, the enhanced adhesion layer comprises the Composition (3). Thus, the enhanced adhesion contains an aqueous-type polyurethane (A3) and a water-soluble resin (B3) comprising mainly vinylalcohol unit and serves to improve adhesion between the stretched polyester film support and a functional layer of a hydrophilic resin. Hereinafter, the water-soluble resin comprising mainly is referred as the water-soluble resin (B3).

The aqueous-type polyurethane for use in the present invention can be selected from those prepared by the ordinary method for use in the form of an aqueous dispersion. In particular, the aqueous-type polyurethane may be prepared by subjecting a raw material mixture containing a polyol, a polyisocyanate, a chain extender or a crosslinking agent, etc. to ordinary polymerizations.

The polyol may be preferably selected from polyester diols, polycarbonate diols and polyether diols. Examples of preferable polyols are polyester-type polyols such as those of polyethylene terephthalate, polyethylene isophthalate, polyethylene cyclohexanecarboxylate, polyethylene adipate, polyhexylene adipate and polycaprolactone; polyether-type polyols such as those of polyoxyethylene glycol, polyoxypropylene glycol, polyoxypropylene triol and polyoxytetramethylene glycol; acrylic-type polyols; and castor oil.

Examples of preferable polyisocyanates are aliphatic diisocyanates such as xylenediisocyanate, hexamethylenediisocyanate, lysindiisocyanate, 4,4'-dicyclohexylmethanediisocyanate and isophoronediisocyanate; and aromatic diisocyanates such as tolylenediisocyanate, phenylenediisocyanate, 4,4'-diphenylmethanediisocyanate and 1,5-naphthalenediisocyanate.

Of these, the use of the aliphatic isocyanate is preferred from the standpoint of color characteristics in a fused state. From the standpoint of adhesion properties and anti-blocking properties, the use of an alicyclic isocyanate is preferred. As compared with aromatic isocyanates, aliphatic isocyanates give aqueous-type polyurethanes having better heat resistance and light resistance. Among aliphatic isocyanates, alicyclic isocyanates give polyurethanes having better anti-blocking properties and adhesion properties.

Examples of the chain extender or crosslinking agent are ethylene glycol, propylene glycol, butanediol, hexanediol, diethylene glycol, trimethylolpropane, glycerin, hydrazine, ethylenediamine, diethylenetriamine, 4,4'-diaminodiphenylmethane, 4,4'-diaminodicyclohexylmethane and water.

Water dispersible functional group units may be incorporated into the aqueous-type polyurethane (A3) by any preferable method. For example, carboxylic acid groups are incorporated by using dimethylol propionic acid as the chain extender. The carboxylic acid groups are thereafter neutralized into carboxylic acid salt groups.

The aqueous-type polyurethane (A3) is preferably a copolymer comprising the above-described units. The average molecular weight (as measured by GPC) of aqueous-type polyurethane (A3) is not specifically limited, but generally, it is not less than 5,000, preferably 8,000 to 100,000. When the average molecular weight of the aqueous-type polyurethane (A3) is less than 5,000, the water resistance of the enhanced adhesion layer or in adhesion to a functional layer may be reduced.

It is preferred that the glass transition temperature (Tg) of the aqueous-type polyurethane (A3) be is not less than 20° C., more preferably not less than 30° C., still more preferably not less than 40° C. When the glass transition temperature is less than 20° C., anti-blocking properties of the enhanced adhesion layer may not be sufficient. The glass transition temperature (Tg) of the aqueous-type polyurethane (A3) is preferably not more than 140° C. When the glass transition temperature of the aqueous-type polyurethane (A3) is more than 140° C., sufficient stretchability at the time of stretching the enhanced adhesion layer together with the polyester film support may not be attained.

The water-soluble resin (B3) used in conjunction with the above aqueous-type polyurethane (A3) preferably contains a major amount of polyvinyl alcohol units. Polyvinyl alcohol used in the fifth aspect of the present invention is the same as that defined in the fourth aspect.

The water-soluble resin (B3) may be obtained, for example, by copolymerizing a low molecular weight compound having a polymerizable unsaturated function group such as an acrylic group or a vinyl group, with the ordinary polyvinyl alcohol units, or by copolymerizing vinyl acetate units a low molecular weight compound having a polymerizable unsaturated function group such as an acrylic group or a vinyl group, followed by a treatment for hydrolysis to remove acetic acid.

The blending ratio of the component (A3): the component (B3) is preferably 1:9 to 9:1, more preferably 1:9 to 8:2.

In the fifth aspect of the present invention, it is preferred that the enhanced adhesion layer contain polyglycerol polyglycidyl ether (C3).

The polyglycerol polyglycidyl ether (C3) of the fifth aspect is the same as that defined in the above fourth aspect.

The enhanced adhesion layer may contain inert particles (D) to improve the slip characteristics thereof, if desired. The inert particles and the amount thereof may be the same as those defined in the above third aspect.

The mixing amount by weight of aqueous-type polyurethane (A3), the water soluble resin (B3) and polyglycerol polyglycidyl ether (C3) of the enhanced adhesion layer is preferably satisfy the following formulas:

$$1/9 \leq (A)/(B) \leq 9/1 \qquad \text{(v)}$$

$$1/1 \leq \{(A)+(B)\}/(C) \leq 100/1 \qquad \text{(vi)}.$$

When the amount of aqueous-type polyurethane (A3) is small, sufficient adhesion between the enhanced adhesion layer and the polyester film support may not be obtained. In order to obtain satisfactory adhesion between the enhanced adhesion layer and the polyester film support, it is preferred that the aqueous-type polyurethane (A3) be present in an amount of not less than 10 parts by weight based on 100 parts by weight of the enhanced adhesion layer.

When the amount of the water-soluble resin (B3) is small, satisfactory adhesion between the enhanced adhesion layer and a functional layer of a hydrophilic resin may not be attained. Thus, the amount of the amount of the water-soluble resin (B3) is preferably not less than 10 parts by weight based on 100 parts by weight of the enhanced adhesion layer because of preferred adhesiveness of the enhanced adhesion layer.

It is preferred that an effective amount of the polyglycerol polyglycidyl ether (C3) is present in a coating liquid containing the ingredients (A3) and (B3) so as to improve adhesiveness, water resistance and anti-blocking properties. When the amount of the polyglycerol polyglycidyl ether (C3) is large, the adhesiveness of the enhanced adhesion layer may be adversely affected. In order to obtain the high performance enhanced adhesion layer, namely in order to obtain the enhanced adhesion layer having improved water resistance, adhesion and anti-blocking properties, it is preferable to incorporate the compound (C3) in a coating liquid for the formation of the enhanced adhesion layer.

If desired, the aqueous-type polyurethane (A3) may be used in conjunction with a water-soluble or water-dispersible binder resin for the formation of the enhanced adhesion layer. The binder resin and the amount thereof may be the same as those defined in the third aspect.

The enhanced adhesion layer may additionally contain a crosslinkable compound other than that described with reference to the aqueous-type polyurethane (A3). The crosslinking compound and the amount thereof may be the same as those defined in the third aspect.

The enhanced adhesion layer of the above second, third and fifth aspects may contain a small amount of an additive such as a surfactant, an anti-foaming agent, a coating property improving agent, a thickening agent, a low molecular weight anti-static agent, an organic lubricant, an anti-oxidation agent, a UV absorbing agent, a foaming agent, a dye or a pigment. These additives may be used singly or in combination of two or more.

The enhanced adhesion layer may be formed on only one surface of the polyester film or on both surfaces thereof. When the enhanced adhesion layer is formed on one of the both surfaces of the polyester film, any functional layer may be formed on the other surface to impart an additional function to the laminated polyester film such as for use as a recording sheet support. In order to improve coating property and adhesiveness of a coating liquid, the polyester film may be subjected to a pretreatment, for example, a chemical treatment or a corona discharge treatment, before the application of the coating liquid.

The thickness of the enhanced adhesion layer is preferably 0.01 to 2 μm, more preferably 0.02 to 0.5 μm, still more preferably 0.03 to 0.2 μm. When the thickness of the enhanced adhesion layer is less than 0.01 μm, sufficient adhesion may not be attained. When the thickness exceeds 2 μm, sufficient anti-blocking properties may not be attained.

The biaxially stretched polyester film may be produced by known methods. For example, previously dried polyester chips and additives are supplied in an extruder through a hopper and melt-kneaded therein at a temperature of 200 to 300° C. The kneaded mixture is then extruded through a die into a sheet. The sheet is quenched on a casting drum (rotary cooling drum) at not more than about 70° C. to obtain an unstretched sheet. The unstretched sheet is stretched in longitudinal and transverse directions to 4 times or more, preferably 9 times or more. The stretched sheet is heat-set at 120 to 200° C.

A method of forming the enhanced adhesion layer on a surface of the biaxially stretched polyester film may be preferably conducted by applying a coating liquid for the enhanced adhesion layer to the surface of the polyester film during the course of the fabrication of the biaxially stretched polyester film. For example, a coating liquid for the enhanced adhesion layer is applied to a surface of the unstretched polyester film and dried. In an alternative method, the coating liquid is applied to a uniaxially stretched polyester film and dried. In a further method, the coating liquid is applied to a surface of the biaxially stretched polyester film. This is followed by the stretching of the coated polyester film and the drying of the coated layer. Of these methods, the method in which the coating liquid is applied to the unstretched or uniaxially stretched polyester film and in which the coated layer is then dried and cured at the time of the heat treatment of the laminated film is economically advantageous.

If desired, two or more of the above methods may be preferably combined for the formation of the enhanced adhesion layer. One such preferable method includes the steps of applying a first coating liquid onto a surface of an unstretched polyester film, drying the coated liquid to form a first layer, stretching the first layer-bearing polyester film in one direction, applying a second coating liquid onto the side of the uniaxially stretched film, and drying the second coating liquid to form a second layer. In this case, the outer surface layer should be the enhanced adhesion layer.

The coating of the polyester film with the enhanced adhesion layer may be conducted by using, for example, a reverse roll coater, a gravure coater, a rod coater or an air doctor coater which are described in "Coating Method" (by HARASAKI, Yuji, edited by Maki Publisher, 1979).

It is preferred that the coating liquid for the formation of the enhanced adhesion layer use water as a major component of the medium thereof because of safety and hygiene. To improve dispersibility or film-forming efficiency, a small amount of an organic solvent may be added to the aqueous medium in an amount so that the organic solvent is dissolved in water. Two or more organic solvents may be used in combination, if necessary.

The laminated polyester film according to the present invention can exhibit good adhesion to any functional layer containing a water-soluble or hydrophilic resin such as polyvinyl alcohol and used for OHP films, labels, plotter films, photographic films, photographic printing films, bar-code labels, magnetic cards and graphic art sheets, and is of great value from an industrial point of view.

EXAMPLES

The present invention is described hereinafter in further detail with reference to the examples thereof. It should be noted, however, that these examples are merely intended to be illustrative and not to be construed as limiting the scope of the invention in any way. In the following Examples and Comparative Examples, all "parts" and "%" are by weight unless otherwise noted.

(1) Adhesion Test to Aqueous Resin

An aqueous resin (polyvinyl acetal; S-Lec KX-1 manufactured by Sekisui Chemical Co., Ltd.; herein after referred as KX-1) was applied onto an enhanced adhesion layer of a test sample of laminated film and dried. The coating liquid having KX-1 concentration of 8% was applied onto the surface using a Baker-type applicator such that the thickness of the liquid coating immediately after application was about 127 μm. The coated film was immediately placed in an oven and heated at 100° C. for 4 minutes to dry the coated layer. A black square pattern (area: 12 cm×12 cm) was printed on a surface of dried KX1 coating by an ink jet printer (BJC-600J manufactured by Canon Inc.) and was dried in air (23° C., 50% RH) for about 12 hours. An adhesive tape (Cellotape manufactured by Nichiban Inc.; width 18 mm) was attached onto the printed surface and rapidly peeled. The degree of printed surface peeled off together with the adhesive tape was observed with naked eyes. The adhesion between the enhanced adhesion layer and the aqueous resin coating was evaluated according to the following three grades.

Peeled in a degree of less than 20%: ○ (good)
Peeled in a degree of no less than 20%: Δ (fair) and less than 80%
Peeled in a degree of not less than 80%: × (no good)

(2) Anti-Blocking Property 1

The adhesion resin layer of a test sample of laminated film is overlaid with an untreated PET film and the assembly film was pressed at a temperature of 40° C., a humidity of 80% RH and a load of 10 kg/cm² for 20 hours. The pressed film was measured for the degree of blocking in terms of a load required for peeling off the PET film from the test sample of laminated film in accordance with ASTM D1893. The degree of blocking was evaluated according to the following three grades:

Load of not less than 50 g and less: ○ (excellent) than 100 g
Load of not less than 100 g and less: Δ (good) than 250 g
Load of not less than 250 g: × (no good)

(3) Anti-Blocking Property 2

Two test samples of laminated film were superimposed with respective adhesion resin layers being in contact with each other. The assembly film was pressed at temperature of 40° C., a humidity of 80% RH and a load of 10 kg/cm² for 20 hours. The pressed film was measured for the degree of blocking in terms of a load required for peeling off one laminated film from the other in accordance with ASTM D1893. The degree of blocking was evaluated according to the following three grades.

Load of not less than 50 g and less: ○ (excellent) than 100 g:
Load of not lower than 100 g and less: Δ (good) than 250 g
Load of not less than 250 g: × (no good)

In Examples and Comparative Examples, the following materials are used for the formation of adhesion resin layers.

Binder Resin A1

Copolyester containing terephthalic acid (45 mol %) and 5-sodiumsulfoisophthalic acid (5 mol %) as dicarboxylic acid components and ethylene glycol (40 mol %) and diethylene glycol (10 mol %) as diol components.

Binder Resin A2

Copolyester containing terephthalic acid (10 mol %) and isophthalic acid (40 mol %) as dicarboxylic acid components and ethylene glycol (8 mol %), diethylene glycol (32 mol %), neopentyl glycol (6 mol %) and propionic acid dimethanol (4 mol %) as diol components.

Binder Resin A3

Copolyester containing terephthalic acid (20 mol %), isophthalic acid (15 mol %), cyclohexanedicarboxylic acid (10 mol %) and 5-sodiumsulfoisophthalic acid (5 mol %) as dicarboxylic acid components, and ethylene glycol (31 mol %), diethylene glycol (4 mol %) and cyclohexanedimethanol as diol components.

Binder Resin A4

Aqueous polyurethane containing a polyester polyol of terephthalic acid (10 mol %), isophthalic acid (40 mol %), ethylene glycol (8 mol %), diethylene glycol (32 mol %) and neopentyl glycol (6 mol %); propionic acid dimethanol (4 mol %) as a chain extender; and isophoronediisocyanate as an isocyanate component.

Polyglycerol Polyglycidyl Ether B1

Denacol EX-521 (manufactured by Nagase Chemicals Ltd.), average molecular weight: 1,000.

Water-Soluble Resin B2

Polyvinyl alcohol having a saponification degree of 94 mol % and a polymerization degree of 500.

Water-Soluble Resin B3

Polyvinyl alcohol having a saponification degree of 88 mol % and a polymerization degree of 1,700.

Polyglycerol Polyglycidyl Ether C1

Denacol EX-521 (manufactured by Nagase Chemicals Ltd.), average molecular weight: 1,000.

Water-Soluble Resin C2

Polyvinyl alcohol having a saponification degree of 88 mol % and a polymerization degree of 1,700.

Water-Soluble Resin C3

Polyvinylpyrrolidone having an average molecular weight of 630,000.

Inert Particles D1

Silica sol having an average particle diameter of 0.05 μm.

Inert Particles D1

Silica sol having an average particle diameter of 0.02 μm.

Example 1

An ester interchange was performed in a conventional manner and the product was mixed with silica particles dispersed in ethylene glycol and having an average particle diameter of 1.4 μm. The mixture was subjected to polycondensation in a conventional manner to obtain polyethylene terephthalate having an intrinsic viscosity of 0.65. The polyethylene terephthalate was melt extruded at a temperature of 280 to 300° C. and cast on a cooling drum while using an electrostatic bonding method to obtain a film having a thickness of about 720 μm. The film was stretched at 85° C. in longitudinal direction for 3.7 times and then stretched in transverse direction at 100° C. for 3.9 times, followed by a heat-treatment at 210° C., thereby obtaining a biaxially stretched polyester film having a thickness of 50 μm.

After the above longitudinal stretching but prior to the transverse stretching, an aqueous dispersion containing 95 parts of Binder Resin A1 (adhesive polyester), 45 parts of water-soluble resin (B2) and 5 parts of Inert Particles D1 (silica sol) was applied onto one side of the polyester film and dried, so that a laminated polyester film having an adhesion resin layer having a thickness of 0.05 μm (after drying and stretching) was obtained after the above transverse stretching.

Examples 2 to 3 and Comparative Examples 1 to 5

The same procedure as defined in Example 1 was conducted except that the composition of the enhanced adhesion layer was changed as shown in Table 1, thereby obtaining laminated polyester films.

The enhanced adhesion layer of each of the thus obtained laminated film was evaluated for adhesion and anti-blocking properties to give the results summarized in Table 2.

TABLE 1

| Example No. | Binder Resin (A) | Water-soluble Resin 1 (B) | Water-soluble Resin 2 (C) | Inert Particles (D) | Thickness (L) (μm) | d/L |
| --- | --- | --- | --- | --- | --- | --- |
| Example 1 | A1 = 50 | B2 = 45 | | D1 = 5 | 0.05 | 1 |
| Example 2 | A2 = 50 | B2 = 45 | | D1 = 5 | 0.05 | 1 |
| Example 3 | A2 = 50 | B2 = 40 | C3 = 5 | D1 = 5 | 0.05 | 1 |
| Comp. Ex. 1 | A1 = 95 | | | D1 = 5 | 0.05 | 1 |
| Comp. Ex. 2 | A2 = 95 | | | D1 = 5 | 0.05 | 1 |
| Comp. Ex. 3 | | B2 = 95 | | D1 = 5 | 0.05 | 1 |
| Comp. Ex. 4 | | | C3 = 95 | D1 = 5 | 0.05 | 1 |
| Comp. Ex. 5 | | B2 = 50 | C3 = 45 | D1 = 5 | 0.05 | 1 |

TABLE 2

| Example No. | Adhesion property | Anti-blocking property |
| --- | --- | --- |
| Example 1 | ○ | ○ |
| Example 2 | ○ | ○ |
| Example 3 | ○ | ○ |
| Comp. Ex. 1 | X | ○ |
| Comp. Ex. 2 | X | Δ |
| Comp. Ex. 3 | X | ○ |
| Comp. Ex. 4 | X | ○ |
| Comp. Ex. 5 | X | ○ |

Example 4

After the longitudinal stretching but prior to the transverse stretching of the polyester film in Example 1, an aqueous dispersion containing 55 parts of Binder Resin A1 (adhesive polyester), 10 parts of Polyglycerol Polyglycidyl ether B1, 30 parts of Water-soluble Resin C2 and 5 parts of Inert Particles D1 (silica sol) was applied onto one side of the polyester film and dried, so that a laminated polyester film having an adhesion resin layer having a thickness of 0.05 μm (after drying and stretching) was obtained after the above transverse stretching.

Examples 5 to 9 and Comparative Examples 6 to 10

The same procedure as defined in Example 4 was conducted except that the composition of the enhanced adhesion layer was changed as shown in Table 3, thereby obtaining laminated polyester films.

The enhanced adhesion layer of each of the thus obtained laminated film was evaluated for adhesion and anti-blocking properties. The results are summarized in Table 4.

TABLE 3

| Example No. | Binder Resin (A) | Water-soluble Resin 1 (B) | Water-soluble Resin 2 (C) | Inert Particles (D) | Thickness (L) (μm) | d/L |
| --- | --- | --- | --- | --- | --- | --- |
| Example 4 | A1 = 55 | B1 = 10 | C2 = 30 | D1 = 5 | 0.05 | 1 |
| Example 5 | A1 = 35 | B1 = 30 | C2 = 30 | D1 = 5 | 0.05 | 1 |
| Example 6 | A1 = 35 | B1 = 30 | C2 = 30 | D1 = 5 | 0.03 | 0.6 |
| Example 7 | A1 = 65 | B1 = 30 | | D1 = 5 | 0.05 | 1 |
| Example 8 | A2 = 65 | B1 = 30 | | D1 = 5 | 0.05 | 1 |
| Example 9 | A3 = 55 | B1 = 40 | | D1 = 5 | 0.05 | 1 |
| Comp. Ex. 6 | A1 = 95 | | | D1 = 5 | 0.05 | 1 |
| Comp. Ex. 7 | A2 = 95 | | | D1 = 5 | 0.05 | 1 |
| Comp. Ex. 8 | A3 = 95 | | | D1 = 5 | 0.05 | 1 |
| Comp. Ex. 9 | | B1 = 95 | | D1 = 5 | 0.05 | 1 |
| Comp. Ex. 10 | | | C2 = 95 | D1 = 5 | 0.05 | 1 |

TABLE 4

| Example No. | Adhesion property | Anti-blocking property |
| --- | --- | --- |
| Example 4 | ○ | ○ |
| Example 5 | ○ | ○ |
| Example 6 | ○ | ○ |
| Example 7 | Δ | ○ |
| Example 8 | Δ | ○ |
| Example 9 | Δ | ○ |
| Comp. Ex. 6 | X | ○ |
| Comp. Ex. 7 | X | ○ |
| Comp. Ex. 8 | X | ○ |
| Comp. Ex. 9 | X | ○ |
| Comp. Ex. 10 | X | ○ |

Example 10

After the longitudinal stretching but prior to the transverse stretching of the polyester film in Example 1, an aqueous dispersion containing 45 parts of Binder Resin A4 (aqueous-type polyurethane), 40 parts of Water-soluble Resin B2, 10 parts of Polyglycerol Polyglycidyl Ether C1 and 5 parts of Inert Particles D1 (silica sol) was applied onto one side of the polyester film and dried, so that a laminated polyester film having an adhesion resin layer having a thickness of 0.05 μm (after drying and stretching) was obtained after the above transverse stretching.

Examples 11 to 20 and Comparative Examples 11 to 14

The same procedure as defined in Example 10 was conducted except that the composition of the enhanced adhesion layer was changed as shown in Table 5 below, thereby obtaining laminated polyester films.

The enhanced adhesion layer of each of the thus obtained laminated film was evaluated for adhesion and anti-blocking properties. The results are summarized in Table 6.

TABLE 5

| Example No. | Binder Resin (A) | Water-soluble Resin 1 (B) | Water-soluble Resin 2 (C) | Inert Particles (D) | Thickness (L) (μm) | d/L |
| --- | --- | --- | --- | --- | --- | --- |
| Example 11 | A4 = 45 | B2 = 40 | C1 = 10 | D1 = 5 | 0.05 | 1 |
| Example 12 | A4 = 40 | B2 = 35 | C1 = 20 | D1 = 5 | 0.05 | 1 |
| Example 13 | A4 = 35 | B2 = 30 | C1 = 30 | D1 = 5 | 0.05 | 1 |
| Example 14 | A4 = 65 | B2 = 30 | | D1 = 5 | 0.05 | 1 |
| Example 15 | A4 = 45 | B2 = 45 | C1 = 5 | D1 = 5 | 0.05 | 1 |
| Example 16 | A4 = 85 | B2 = 10 | C1 = 10 | D1 = 5 | 0.05 | 1 |
| Example 17 | A4 = 40 | B2 = 35 | C1 = 20 | D1 = 5 | 0.10 | 0.2 |
| Example 18 | A4 = 10 | B2 = 10 | C1 = 75 | D1 = 5 | 0.05 | 1 |
| Example 19 | A4 = 95 | B2 = 5 | | D1 = 5 | 0.05 | 1 |
| Example 20 | A4 = 45 | B2 = 35 | C1 = 20 | | 0.05 | 0 |
| Comp. Ex. 11 | A4 = 95 | | | D1 = 5 | 0.05 | 1 |
| Comp. Ex. 12 | | B2 = 95 | | D1 = 5 | 0.05 | 1 |
| Comp. Ex. 13 | | | C1 = 95 | D1 = 5 | 0.05 | 1 |
| Comp. Ex. 14 | A4 = 75 | | C1 = 20 | D1 = 5 | 0.05 | 1 |

TABLE 6

| Example No. | Adhesion property | Anti-blocking property 1 | Anti-blocking property 2 |
| --- | --- | --- | --- |
| Example 11 | ○ | ○ | ○ |
| Example 12 | ○ | ○ | ○ |
| Example 13 | ○ | ○ | ○ |

TABLE 6-continued

| Example No. | Adhesion property | Anti-blocking property 1 | Anti-blocking property 2 |
|---|---|---|---|
| Example 14 | ○ | ○ | Δ |
| Example 15 | ○ | ○ | ○ |
| Example 16 | Δ | ○ | ○ |
| Example 17 | ○ | Δ | X |
| Example 18 | Δ | ○ | ○ |
| Example 19 | Δ | ○ | Δ |
| Example 20 | ○ | Δ | Δ |
| Comp. Ex. 11 | X | ○ | Δ |
| Comp. Ex. 12 | X | ○ | ○ |
| Comp. Ex. 13 | X | ○ | ○ |
| Comp. Ex. 14 | X | ○ | ○ |

What is claimed is:

1. A laminated polyester film comprising:

a polyester support, and at least one enhanced adhesion layer which is laminated on the polyester support, has a thickness of 0.01 to 0.2 μm, and comprises composition (1) of an aqueous-type copolyester (A1), aqueous-type resin (B1) having vinyl alcohol as a main constituting unit thereof and a copolymer resin (C1) having vinylpyrrolidone as a main constituting unit thereof.

2. A laminated polyester film according to claim 1, wherein the amounts of the components (A1), (B1) and (C1) in weight satisfy the following formulas:

$$1/9 \leq (A1)/\{(B1)+(C1)\} \leq 9/1 \tag{i}$$

$$2/8 \leq (B1)/(C1) \tag{ii}$$

3. A laminated polyester film comprising:

a polyester support, and at least one enhanced adhesion layer which is laminated on the polyester support, has a thickness of 0.01 to 0.2 μm, and comprises composition (1) of an aqueous-type copolyester (A1), aqueous-type resin (B1) having vinyl alcohol as a main constituting unit thereof and a polyglycerol polyglycidyl ether (C2).

4. A laminated polyester film according to claim 3, wherein the amount of the components (A1), (B1) and (C2) in weight satisfy the following formulas:

$$1/9 \leq (A1)/(B1) \leq 9/1 \tag{v}$$

$$1/1 \leq \{(A1)+(B1)\}/(C2) \leq 100/1 \tag{vi}$$

5. A laminated polyester film comprising:

a polyester support, and at least one enhanced adhesion layer which is laminated on the polyester support, has a thickness of 0.01 to 0.2 μm, and comprises composition (3) of an aqueous-type polyurethane (A3), an aqueous-type resin (B3) having vinyl alcohol as a main constituting unit thereof, and inert particles, wherein the thickness (L) of said enhanced adhesion layer and the average particle diameter (d) of said inert particles satisfy the following formulas:

$$1/3 \leq d/L \leq 3 \tag{vii}$$

* * * * *